(12) United States Patent
Zheng

(10) Patent No.: US 11,938,891 B2
(45) Date of Patent: Mar. 26, 2024

(54) DRIVERLESS VEHICLE PLUG-IN EMERGENCY BRAKING APPARATUS

(71) Applicant: Jinghua Zheng, Malden, MA (US)

(72) Inventor: Jinghua Zheng, Malden, MA (US)

( * ) Notice: Subject to any disclaimer, the term of this patent is extended or adjusted under 35 U.S.C. 154(b) by 63 days.

(21) Appl. No.: 17/730,931

(22) Filed: Apr. 27, 2022

(65) Prior Publication Data

US 2023/0150449 A1    May 18, 2023

Related U.S. Application Data

(63) Continuation-in-part of application No. 17/525,893, filed on Nov. 13, 2021, now abandoned.

(51) Int. Cl.
*B60R 21/36* (2011.01)
*B60R 21/00* (2006.01)
*B60T 7/22* (2006.01)

(52) U.S. Cl.
CPC ............... *B60R 21/36* (2013.01); *B60T 7/22* (2013.01); *B60R 2021/0004* (2013.01)

(58) Field of Classification Search
CPC .... B60R 21/36; B60R 2021/0004; B60T 7/22
USPC ............................................. 180/275; 293/2
See application file for complete search history.

(56) References Cited

U.S. PATENT DOCUMENTS

| | | | | |
|---|---|---|---|---|
| 1,040,244 A | * | 10/1912 | Shadlopski | B60T 7/22 293/8 |
| 1,123,538 A | * | 1/1915 | Imamura | B60R 19/26 180/278 |
| 1,504,505 A | * | 8/1924 | Reed | B60R 19/32 293/137 |
| 2,068,278 A | * | 1/1937 | Perillard | B60R 19/02 180/275 |
| 3,862,669 A | * | 1/1975 | Lindbert | B60R 21/33 180/274 |
| 5,101,927 A | * | 4/1992 | Murtuza | B60T 7/22 293/118 |
| 6,032,992 A | * | 3/2000 | He | B60T 7/22 180/277 |

* cited by examiner

*Primary Examiner* — Drew J Brown
*Assistant Examiner* — Tiffany L Webb
(74) *Attorney, Agent, or Firm* — Jie Tan; JT Law Services, PC

(57) ABSTRACT

An external emergency brake apparatus has an air fairing, an airbag assembly for holding a plurality of airbags, a sliding unlock lever, a bracket assembly that comprises two sliding grooves and two fixing grooves, a bracket release assembly that latches said sliding unlock lever horizontally to a first position and a contact power switch device that is coupled to the car's brake power control.

8 Claims, 12 Drawing Sheets

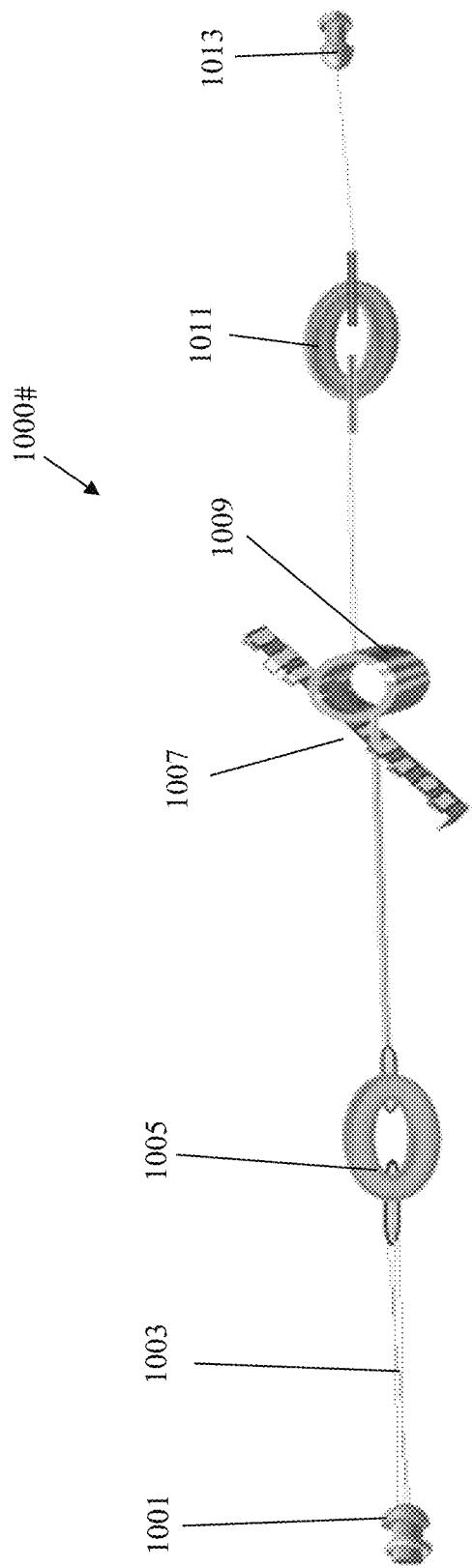
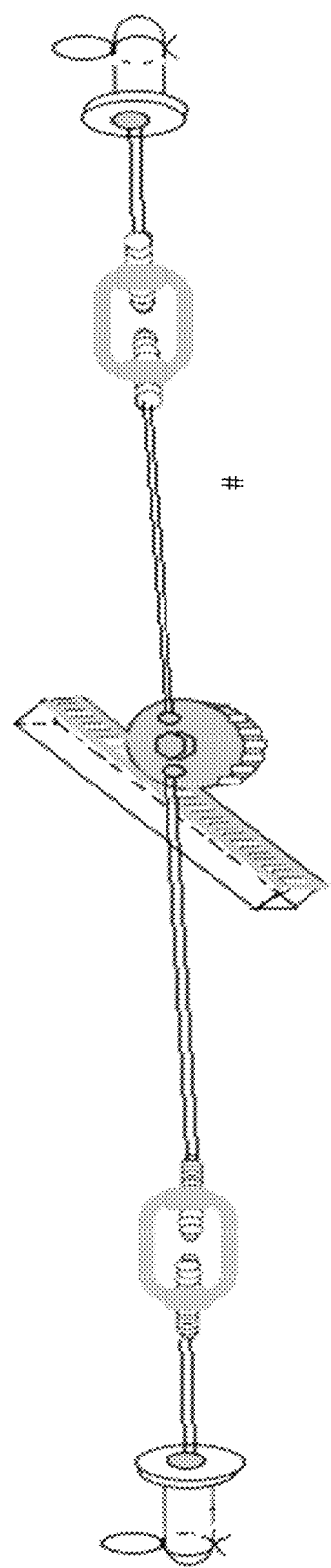
FIG. 10A
FIG. 10B

DRIVERLESS VEHICLE PLUG-IN EMERGENCY BRAKING APPARATUS

CROSS-REFERENCE

Priority is claimed from the U.S. patent application Ser. No. 17/525,893, filed on Nov. 13, 2021, the entirety of which is hereby incorporated by reference.

DESCRIPTION OF RELATED ART

The present application relates to an emergency brake apparatus, and more particularly to a plug-in emergency brake apparatus for driverless vehicles.

Note that the points discussed below may reflect the hindsight gained from the disclosed inventions, and are not necessarily admitted being prior art.

There have been growing awareness and interest in autonomous vehicles (AVs) among the public. Many Americans recognize that their communities haven't done enough to increase transportation equity and feel AVs will help improve mobility. Changes in streetscape infrastructure from COVID has also helped people recognize the potential benefits of having fewer cars on the roads. Fully autonomous vehicles hold the promise of drastically reducing crashes. But during the transition, crashes which will someday be avoidable will continue to happen. Safety is an ongoing critical, fundamental priority. Enabling seat belts, airbags, side-curtain bags, windshield inner-layers, pedestrian collision protection safety features and padded dashes, plastics will continue to enhance safety in self-driving cars.

An autonomous car will use sensors that "peer" through plastics like Light Imaging Detection and Radar (LIDAR) to successfully navigate paved roadways and off-road trails. LIDAR uses lasers to create a 3D map of the world in real time, on the fly, detecting obstacles and identifying the shapes and boundaries within and along a roadway. Thermoplastics, like polycarbonate, permit light and imaging transparency. Integrating thermoplastics and plastic films into front grills and bumpers can allow engineers to mount LIDAR detection sensors "invisibly" into the design of a vehicle's grill, side panels or bumpers.

Despite claims to the contrary, self-driving cars currently have a higher rate of accidents than human-driven cars, but the injuries are less severe. It seems to be true that the vast majority of all accidents involving self-driving cars have been the result of the human driver being distracted, as often happens in a car with no automation. Drivers are supposed to be alert and ready to take over control at a moment's notice, but this is not likely when the car is purchased as driverless. Also, driverless cars use lithium-ion (LI) batteries which are well-known to be highly combustible. As lithium burns, it creates a metal fire with temperatures that reach 3,632 degrees Fahrenheit or 2,000 degrees Celsius. Attempting to douse the fire with water could lead to a hydrogen gas explosion. This can cause an explosion of toxic gases, the release of projectiles, and fire, presenting an additional danger to emergency responders.

Additional mechanical emergency brake system is needed to increase the safety of the driverless cars.

SUMMARY

The present application discloses a novel mechanical external plug-in mechanical emergency brake device that enables a driverless car to activate its brake system without any control devices from inside the car.

In one embodiment, the emergency brake device is configured to be externally mounted externally underneath the body frame of a car.

In another embodiment, the emergency brake device is configured to be controlled by mechanical force external from the internal electronic system.

In another embodiment, the emergency brake device comprises structures of air fairing, air bagged frame installed in the front of a car to reduce the impact on a pedestrian in collision with a car, and a sliding unlock lever and bracket release system coupled with a contact power switch to reduce fatal accidents. A pedestrian struck by a car will be first pushed backwards by the release of the airbags, and at the same time, the sliding unlock lever will be released to push the contact power switch to automatically turn on the brake system to prevent the car from further moving forward. The bracket and release combination accessories also moving to the rear end of the car, mitigating the striking colliding force of the car, thus will greatly reduce the chances of fatally injuring a person struck by the car.

The disclosed innovation, in various embodiments, provide one or more of at least the following advantages, that is, the car can be automatically stopped by external mechanical force outside the car, bypassing the internal electronic system, and this increases the safety of a driverless car.

However, not all of these advantages result from every one of the innovations disclosed, and this list of advantages does not limit the various claimed inventions.

BRIEF DESCRIPTION OF THE DRAWINGS

The disclosed application will be described with reference to the accompanying drawings, which show important sample embodiments of the invention, and which are incorporated in the specification hereof by reference, wherein:

FIG. 10A shows an example bracket release accessories of an example emergency brake apparatus in accordance with this application.

FIG. 10B shows an alternative bracket release accessories of an example emergency brake apparatus in accordance with this application

DETAILED DESCRIPTION OF SAMPLE EMBODIMENTS

Figure 1:
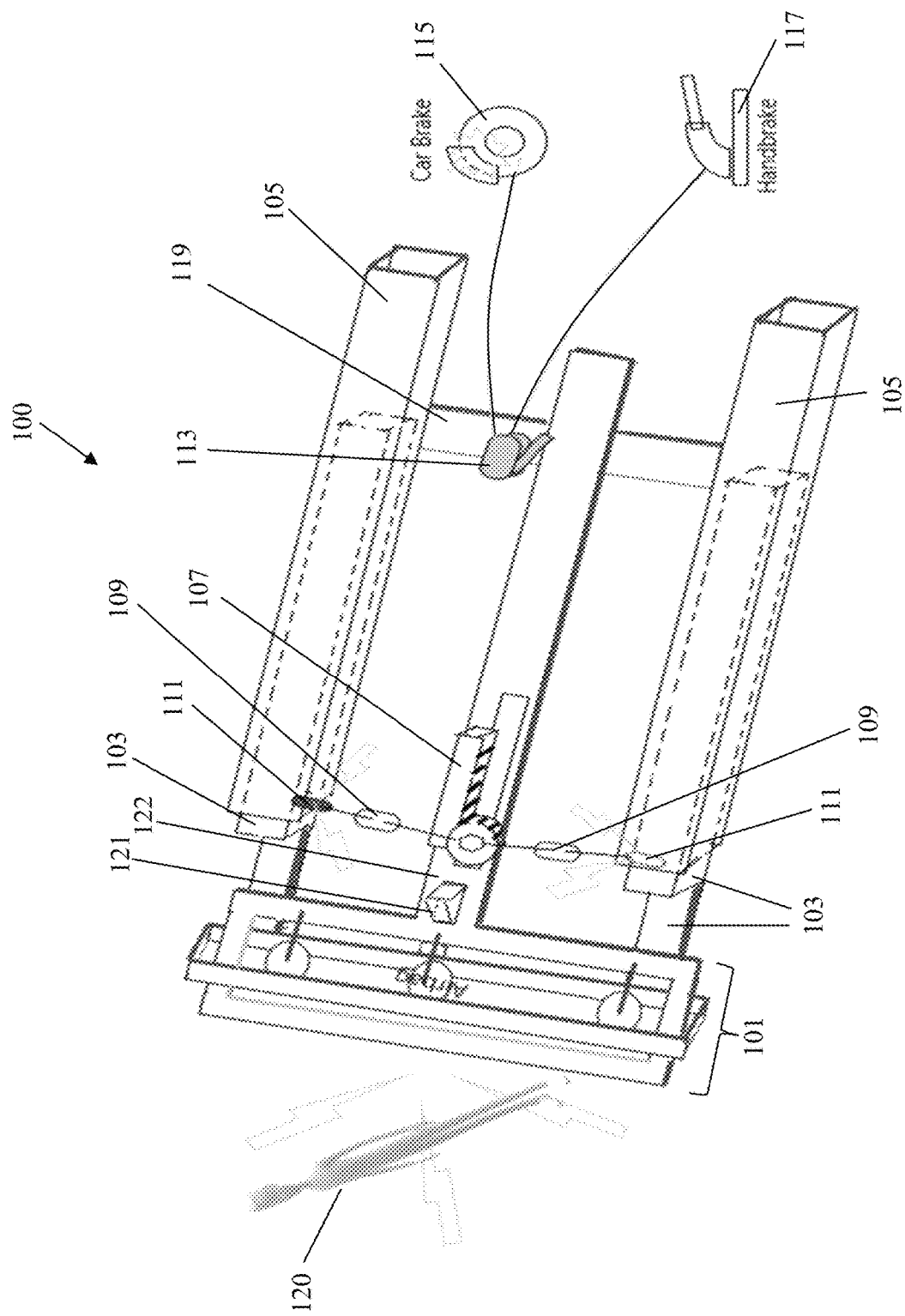
FIG. 1 schematically shows the structure of an example emergency brake apparatus in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements but may include other elements not expressly listed or inherent to such process, method, article, apparatus, or composition.

It is contemplated and intended that the emergency brake apparatus can be made of any suitable material, for clarity reason, the examples are given based on steel frames with parts made of metal or plastic materials, but an ordinary person in the art would know the variations to modify the design to make it suitable for different types of cars, trucks and different motor vehicles.

In reference to FIG. 1, emergency brake apparatus 100 comprises a front airbag frame assembly 101, sliding unlock lever 122 with a slot to buckle up a metal spring structure 121, a bracket assembly that comprises two sliding grooves 103 and two fixing grooves 105 of which the grooves 103 match with grooves 105, latches 111 with wire ropes that are fastened to the two sliding grooves 103 and two fixing grooves 105, wire rope tensioner 109 and wire ropes that are mounted to a gear assembly 107, linking gear assembly 107 to latches 111, a contact power switch device 113 that is coupled to the car's power brake system 115 and handbrake 117 to turn on or off the car's brake system. Contact power switch device 113 is coupled with slide unlock lever 122 which is mounted to the bracket assembly (103, 105) that are mounted on the car's bottom chassis frame 119. airbag frame assembly 101 preferably comprises a rectangular frame that holds multiple airbags in different directions. The sliding unlock lever 122 preferably comprises a rectangular frame that is nested with the rectangular frame of the airbag frame assembly, and the sliding unlock lever 122 is normally fixedly fastened at the first position by the two latches 111 and gear assembly 107 (bracket release accessories) on the two sliding grooves 103 and further immobilized by the metal spring 121.

Figure 2:
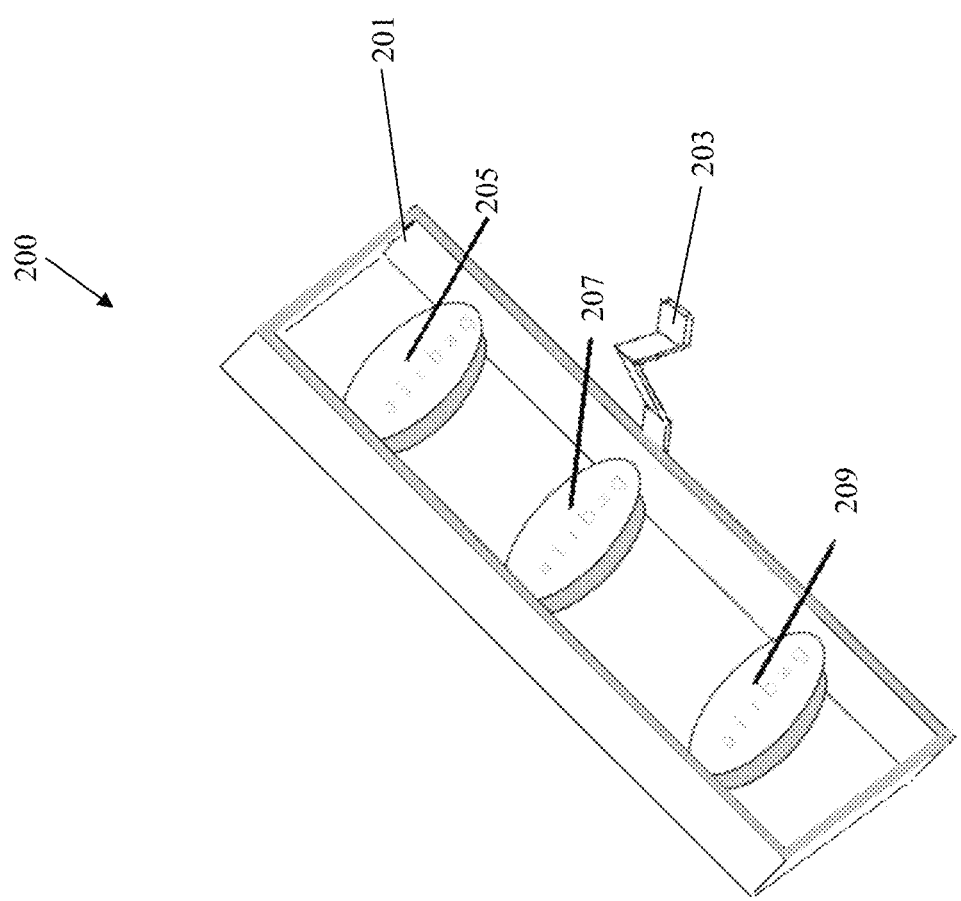
FIG. 2 shows an example airbag frame of an example emergency brake apparatus in accordance with this application.

In reference to FIG. 2, front airbag frame assembly 101 includes an airbag frame 200 that is mounted with a spring steel sheet 203 is attached to the airbag frame 200. Airbag frame 200 comprises preferably a rectangular frame 201 that holds multiple airbags 205, 207 and 209 at different directions. Airbag frame 201 may be made of plastic material or rubber. Spring steel sheet 203 is coupled to the slot structure 705 in FIG. 7 on the sliding unlock lever 122 to buckle up and immobilize the sliding unlock lever in its first position.

Figure 3:
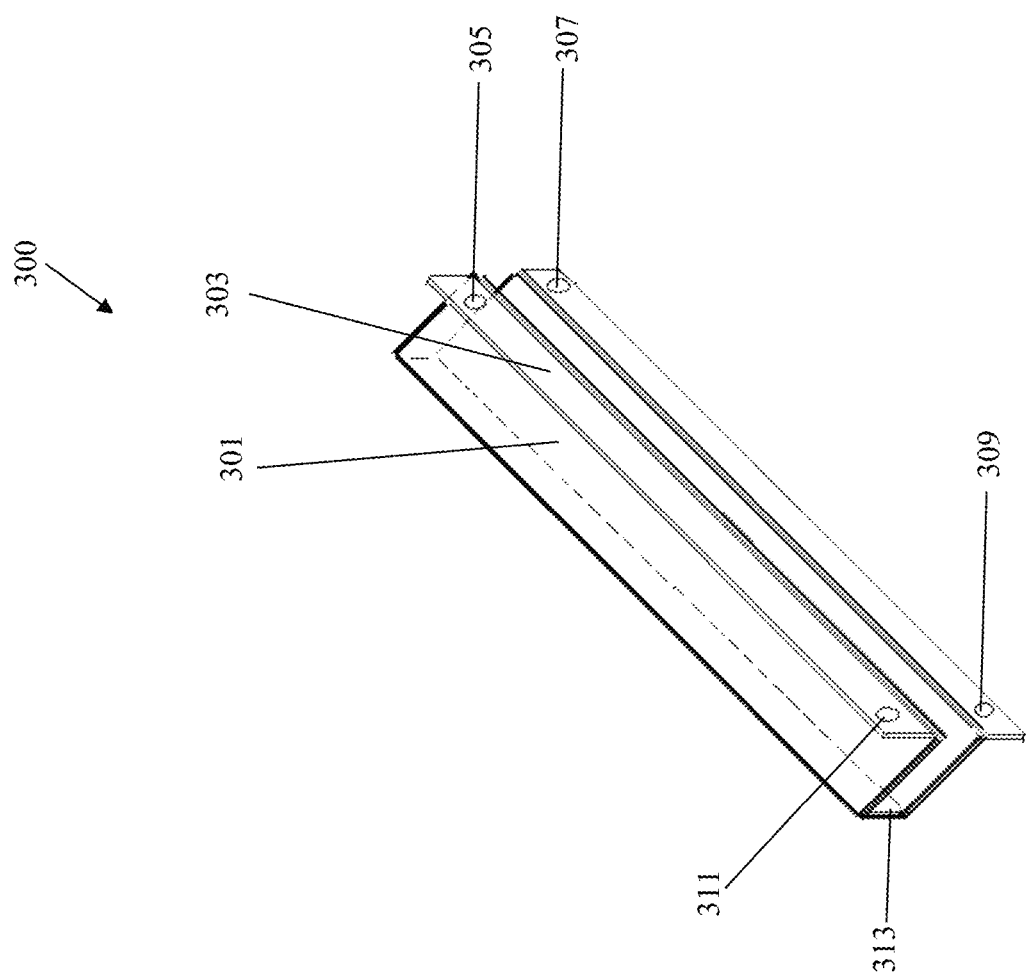
FIG. 3 shows an example air fairing of an example emergency brake apparatus in accordance with this application.

In reference to FIG. 3, air fairing 300 is configured with attaching mechanisms 305, 307, 311 and 309 with a groove structure 313 that can be sleeved or cased onto the rectangular head 701 of sliding unlock lever (FIG. 7) and mounted in front the conventional front bumper of the car. Air fairing is preferably made of flexible and elastic rubber material.

Figure 4:
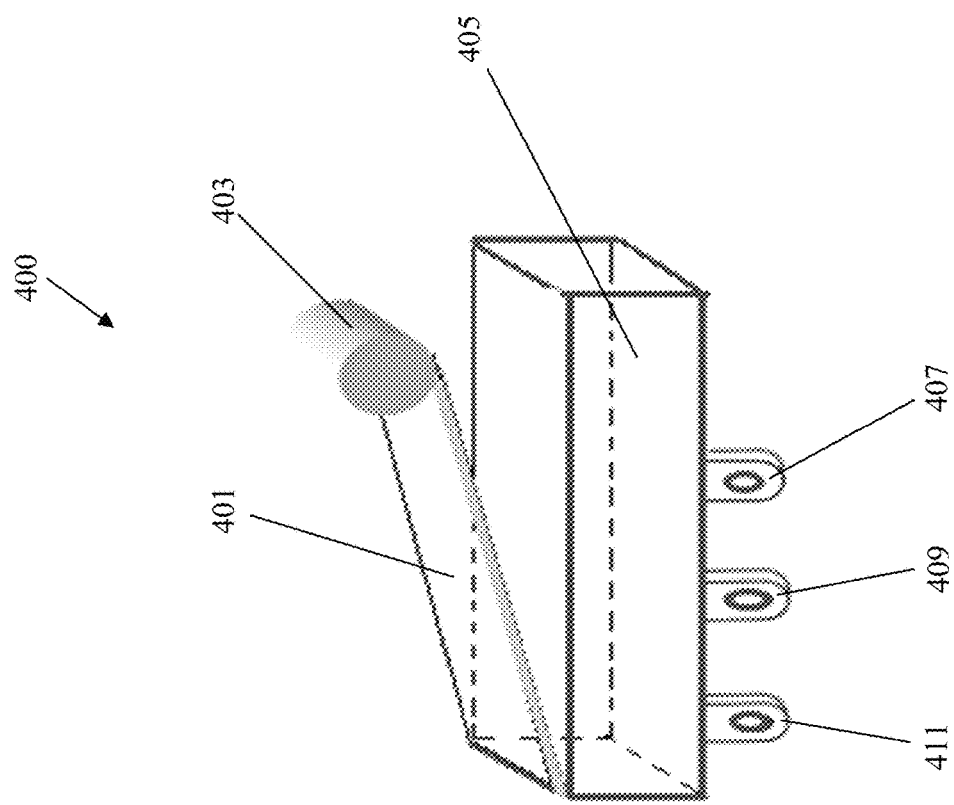
FIG. 4 shows an example contact power switch of an example emergency brake apparatus in accordance with this application.

In reference to FIG. 4, contact power switch 400 comprises a switch box 405 and a metal spring piece 401 with a contact point 403, switch box 405 has three terminals 411, 409 and 407 that are linked to the electrically assisted brake's electrical power source.

Figure 5:
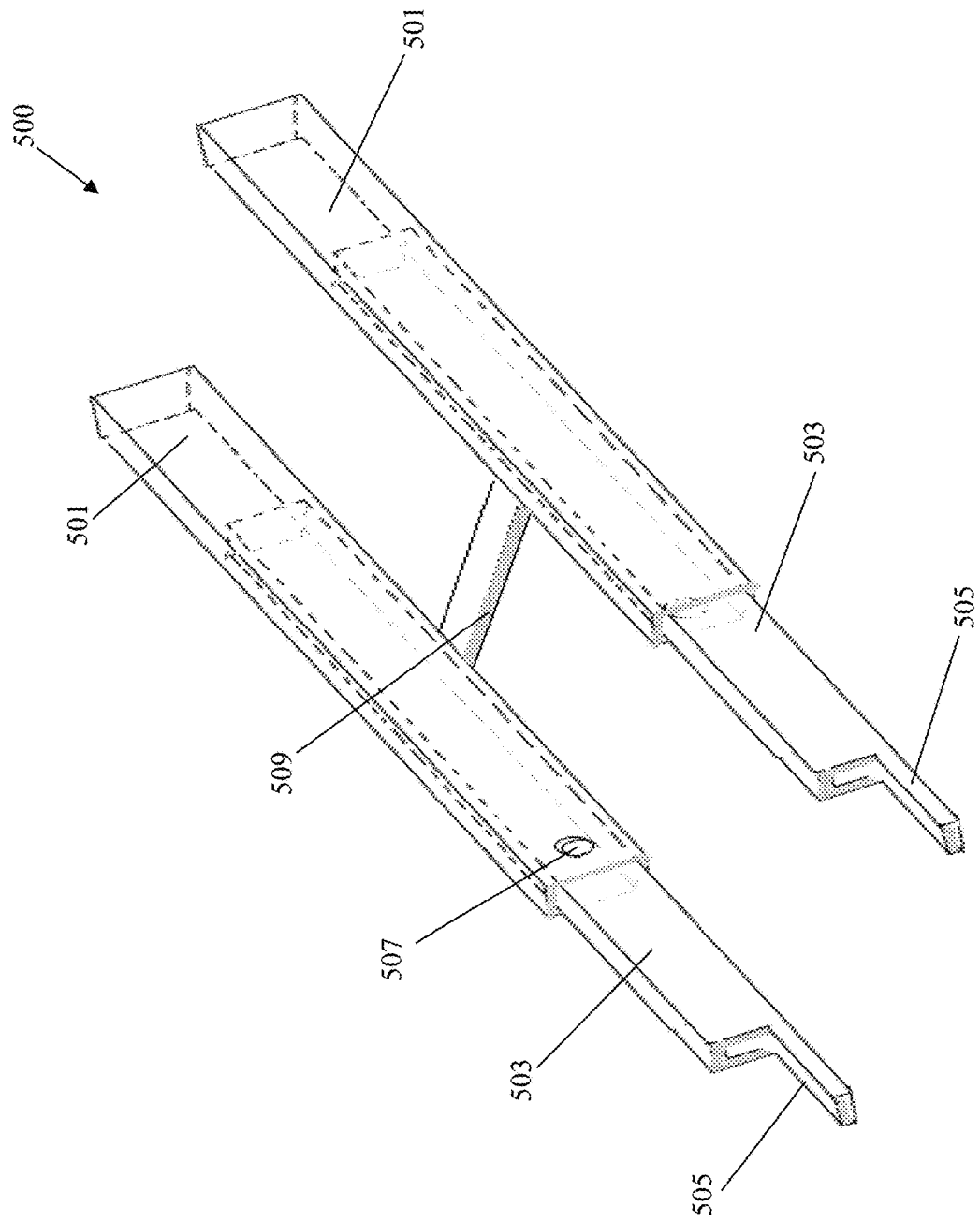
FIG. 5 shows an example bracket of an example emergency brake apparatus in accordance with this application.

In reference to FIG. 5, bracket assembly 500 comprises two sliding grooves 503 and two fixing grooves 501, sliding grooves 503 are configured to slide inside fixing grooves 501. Upon the bracket assembly, both grooves 503 and 501 are configured with matching latch holes 507 which allow a latch to be inserted to fix the sliding groove 503 at its first position on fixing groove 501. Between the two fixing grooves is a supporting frame 509 that holds the fixing grooves at one place so that they do not shift with each other. Each sliding groove 503 has a tip structure 505 for mounting to airbag frame assembly.

If the car strikes a person 120, as shown in FIG. 1, on the air fairing, the air faring will change shape and the sensors on the airbag frame assembly 101 will trigger and release air bags 205-209 to push the parson away from the car, preventing the person from being further struck by the car; at the same time, the airbag release force will also release the spring steel sheet 203 from the slot of sliding unlock lever 122, the strike will also push the sliding unlock lever 122 to move towards the rear end of the car. When the sliding unlock lever 122 moves towards to the rear end of the car, its move will press onto the adjacent contact power switch 113 that will turn on the power brake 115 or hand brake 117 to stop the car from moving forward. The release of sliding unlock lever 122 from the metal spring 203 will also release latch 111 from bracket assembly (103, 105) and allow the airbag frame that is mounted together with the sliding grooves 103 to slide backwards, thus reducing the impact of the collision on the car. The release of airbags at the front of the car coupled with the airbag frame moving backwards will thus doubly reduce the impact of the collision, combined with rubber material air fairing will thus dramatically increase the safety of the car and decrease fatal injuries in car collisions. Alternatively the collision sensors are installed on the sliding unlock lever 122, the move of the sliding unlock lever 122 will trigger ignition of the airbags and inflate the airbags from the airbag frame.

Figure 6:
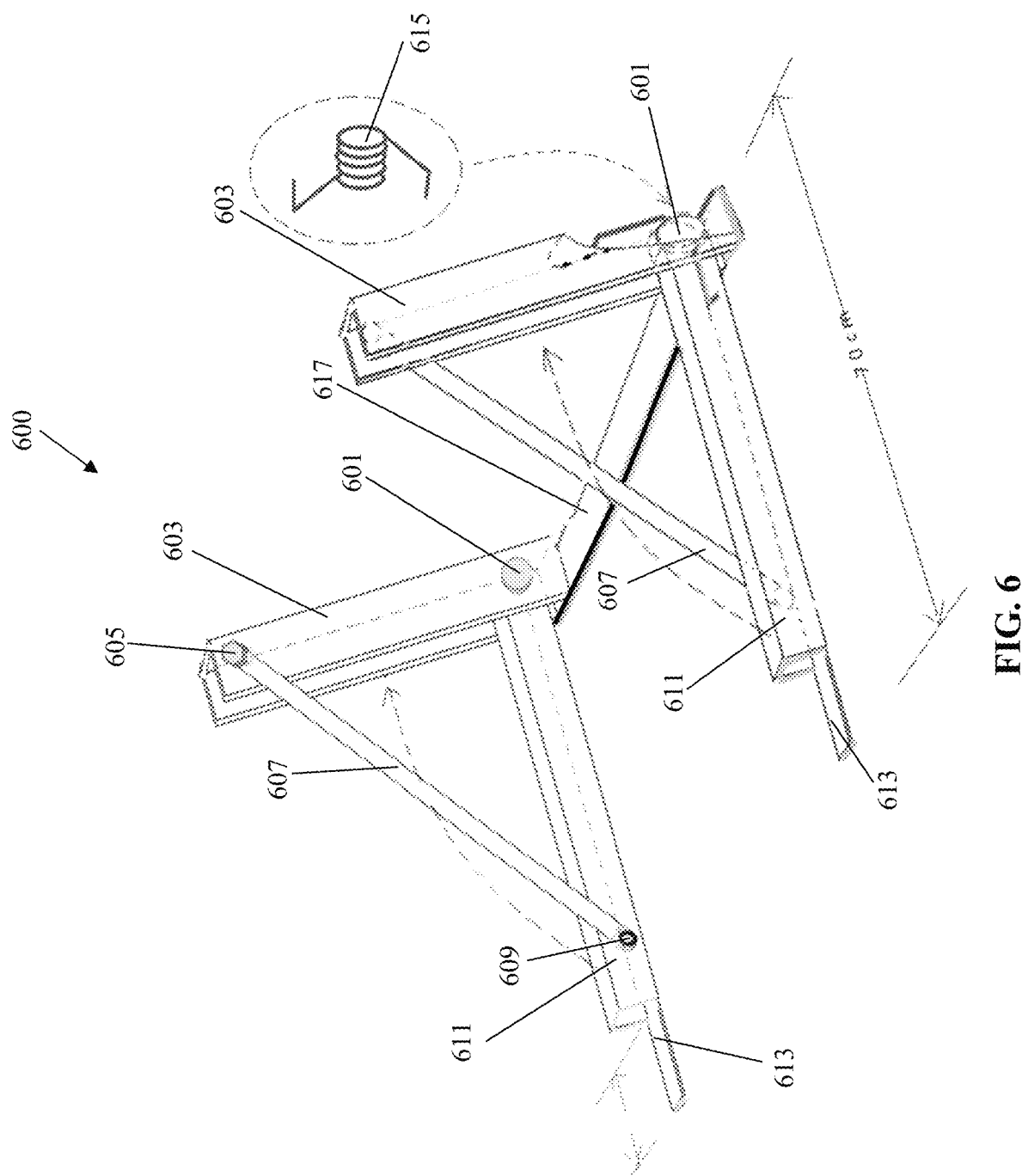
FIG. 6 shows an alternative design of the brackets of an example emergency brake apparatus in accordance with this application.

In reference to FIG. 6, alternative bracket assembly 600 comprises 2 sliding grooves 611 and fixing grooves 603. Sliding groove 611 each is fixed at its first position by shaft 607 that allows sliding groove 511 to rotate around a spring 615 mounted at the joint 601 between sliding groove 611 and fixing groove 603. Each sliding groove 611 has a tip structure 613 for mounting to and interacting with airbag frame.

Figure 7:
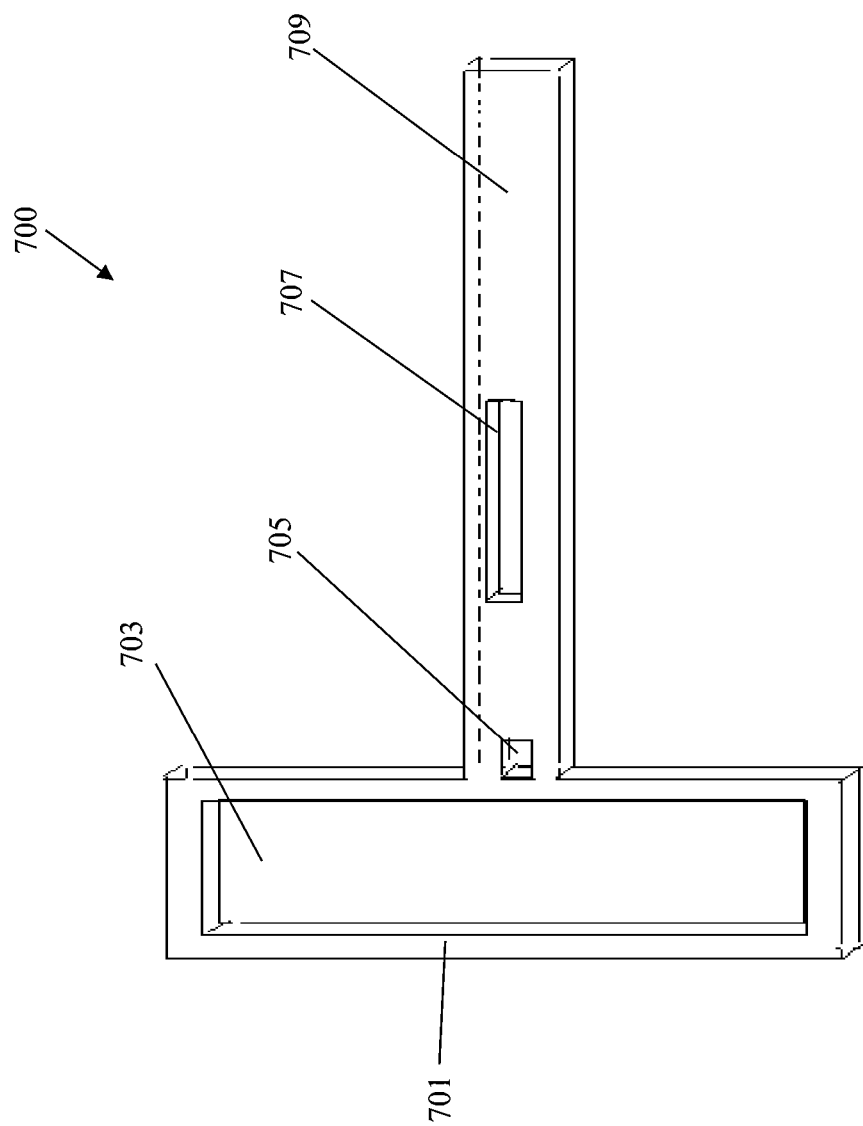
FIG. 7 shows an example slide unlock lever of an example emergency brake apparatus in accordance with this application.

In reference to FIG. 7, sliding unlock lever 700 comprises a sliding shaft 709 and a rectangular holding frame 701 forming a slot 703 for nesting with the airbag frame assembly. An Air fairing can be sleeved onto the rectangular frame 701. On the sliding shaft 709, a slot 705 and an elongated slot 707 are constructed to interact with a gear assembly and a metal spring sheet from the airbag frame assembly.

Figure 8:
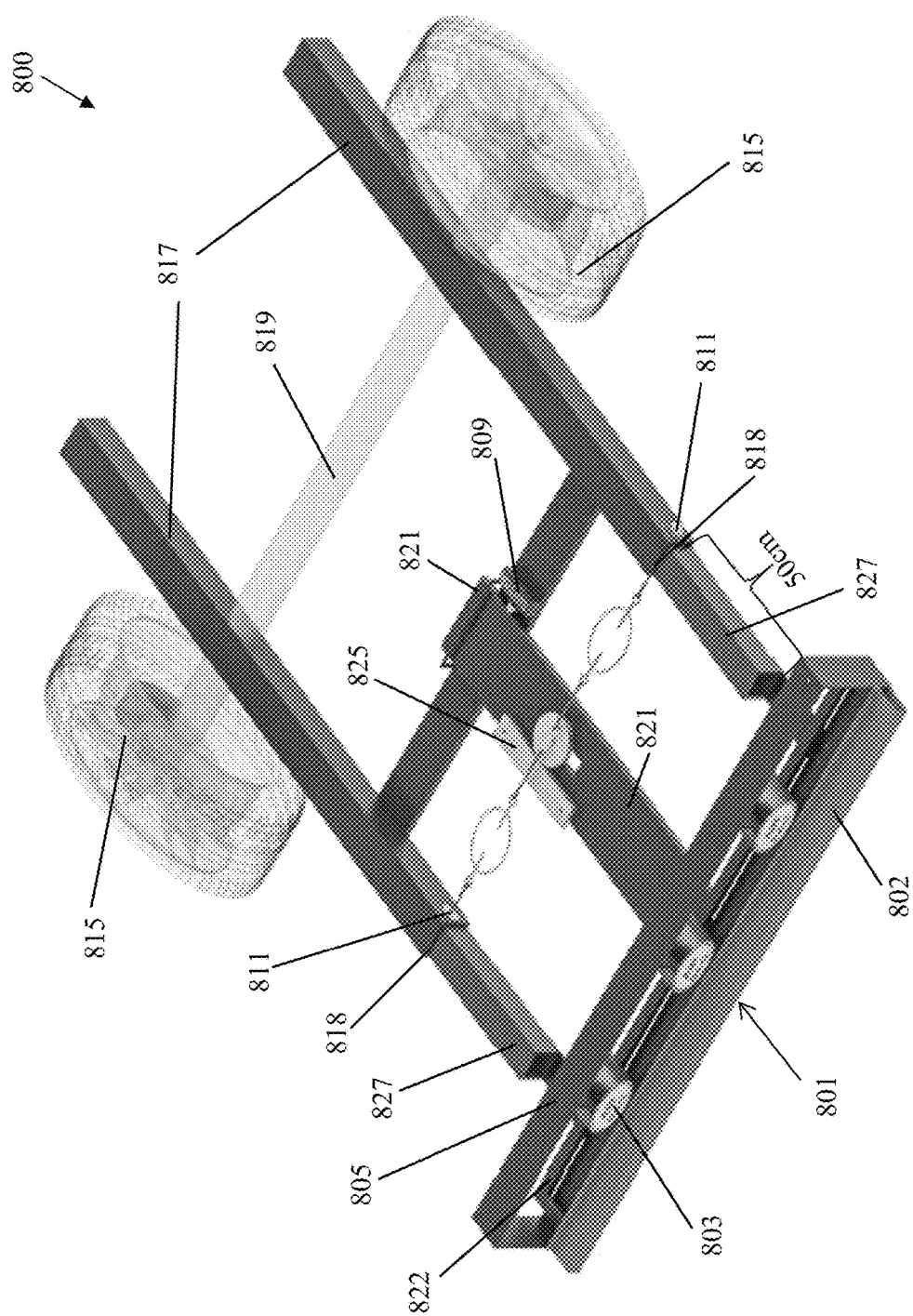
FIG. 8 shows an example of an assembled emergency brake apparatus in accordance with this application.

FIG. 8 shows a 3D construct of emergency brake apparatus 800 in relation to the rear wheels 815. The air fairing 802 is sleeved on the rectangular head frame 822 of sliding unlock lever 821 while the rectangular head frame 822 is nested with the airbag frame 805 to prevent them moving during driving. The sliding unlock lever 821 is further immobilized by buckling up with the metal spring of 203 of the airbag assembly (also shown in FIG. 12) to further prevent the sliding unlock lever 821 from moving during driving. If the car is exposed to collision force 801, disformed air fairing will release the sliding unlock lever 821 from the metal spring of the airbag frame and sliding unlock lever 821 will be pushed towards the rear end of the car by the strike; and at the same time a plurality of airbags 803 will be inflated by the strike. This move will enable sliding unlock lever 821 to press over the metal lever (401 in FIG. 4) of adjacent contact power switch 809 to turn on the power brake or hand brake to stop the car from moving forward. At the same time, the airbag frame 805 and its mounted sliding grooves 827 will become movable, the bracket accessories (latches 811, wire ropes and gear set 825) will pulled out from fixing grooves because of the release of sliding unlock lever 821 from its first position, the airbag frame and the sliding groove 827 will break from the latches 811 and slide into the fixing grooves towards the rear end of the car, this move may break latches 811 from the bracket to further release the sliding grooves to move towards to the rear end of the car.

The entire emergency brake apparatus 800 is preferably installed upon the bottom chassis of the car external to the interior space of the car. The front ends 818 of the fixing grooves 817 are preferably positioned near the conventional front bumper and the sliding frame 827 is about 50 cm, therefore between the airbag frame 805 and the front bumper of the car there is a 50 cm space. When a car is colliding with an object horizontally, the strike force is F=m*(V2-V1)/t where V2 and V1 are speed before and after collision, and m is the colliding object's mass. With the installation of emergency brake apparatus 800, at collision, the air fairing is the colliding contact potion that changes shape which released the sliding unlock lever 821 from its fixed first position on the car, therefore the sliding unlock lever 821 is not part of the mass of the car. Because the air fairing is the colliding contact portion, the strike force is thus reduced to be only related to the mass of the sliding unlock lever 821. The first strike force is thus greatly reduced. At the same time, when the latches are released from the fixing grooves of the bracket assembly, the airbag frame and the sliding grooves are relaxed, and they become not part of the mass of the car, therefore the second-strike force is related to a mass that is much less than the car's mass, therefore the second-strike force is much less than the strike force produced by a conventional front bumper.

When the air fairing first strikes a pedestrian, the second-strike force will be from the inflation of the airbags, the person will be pushed away from the car, the airbag frame will not contact the victim, the victim will not be fatally injured. Because the airbag frame has a 50 cm distance (can vary among different types of cars and trucks) from the front bumper of the car, when the front bumper reaches to the first colliding position, the victim will have already be pushed backward and fall on the ground, thus the chances of the victim be struck by the car's front bumper are greatly reduced. Because the height of emergency brake apparatus 800 is configured within 30 cm and is installed upon the bottom chassis frame of the car, it is unlikely to strike the head of the victim.

Figure 9:
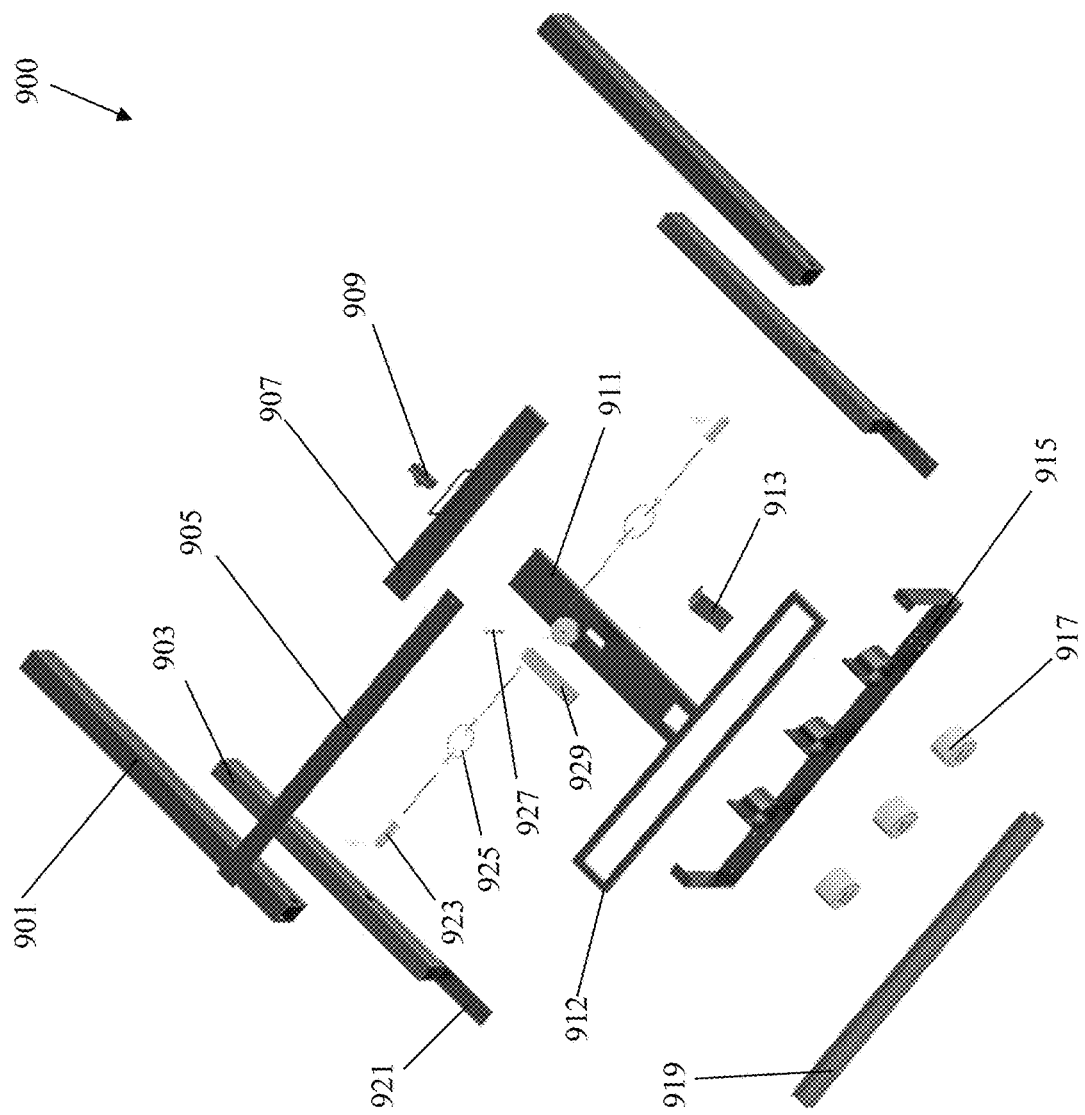
FIG. 9 shows an explosive view of an example emergency brake apparatus in accordance with this application.

FIG. 9 is an explosive view of emergency brake apparatus 900. The individual parts comprise an air fairing 919, airbags 917, airbag frame 905, sliding unlock lever 911, spring steel sheet 913, a bracket assembly that comprises two sliding grooves 903 and two fixing grooves 901 of which the grooves 903 match with grooves 901, latches 923 with wire ropes that are latched to the two sliding grooves 903, wire rope tensioner 925 and wire ropes that are mounted to a gear assembly 929, a contact power switch device 909 mounted on the cross frame 905 and 907 that is coupled to the car's power brake system and handbrake to turn on or off the car's brake system. Air fairing functions to divert the air flow and to reduce strumming and reduce the normal drag coefficient to the sliding unlock lever.

In reference to FIGS. 10A and 10B, bracket release accessories 1000 comprises latches 1001, 1013, wires 1003, wire rope tensioners 1005, 1011, and gear set 1007. Latch and gear assembly 1000 fixes the sliding unlock lever at its first position to the sliding grooves of the bracket assembly before any collision. When a collision force strikes the sliding unlock lever, the sliding unlock lever will be pushed backwards, and the latches will be released from the sliding grooves, allowing the sliding unlock lever to move to its second position that will push the power contact switch in FIG. 4 to switch its position into contact, and turn on the brake control.

Figure 11:
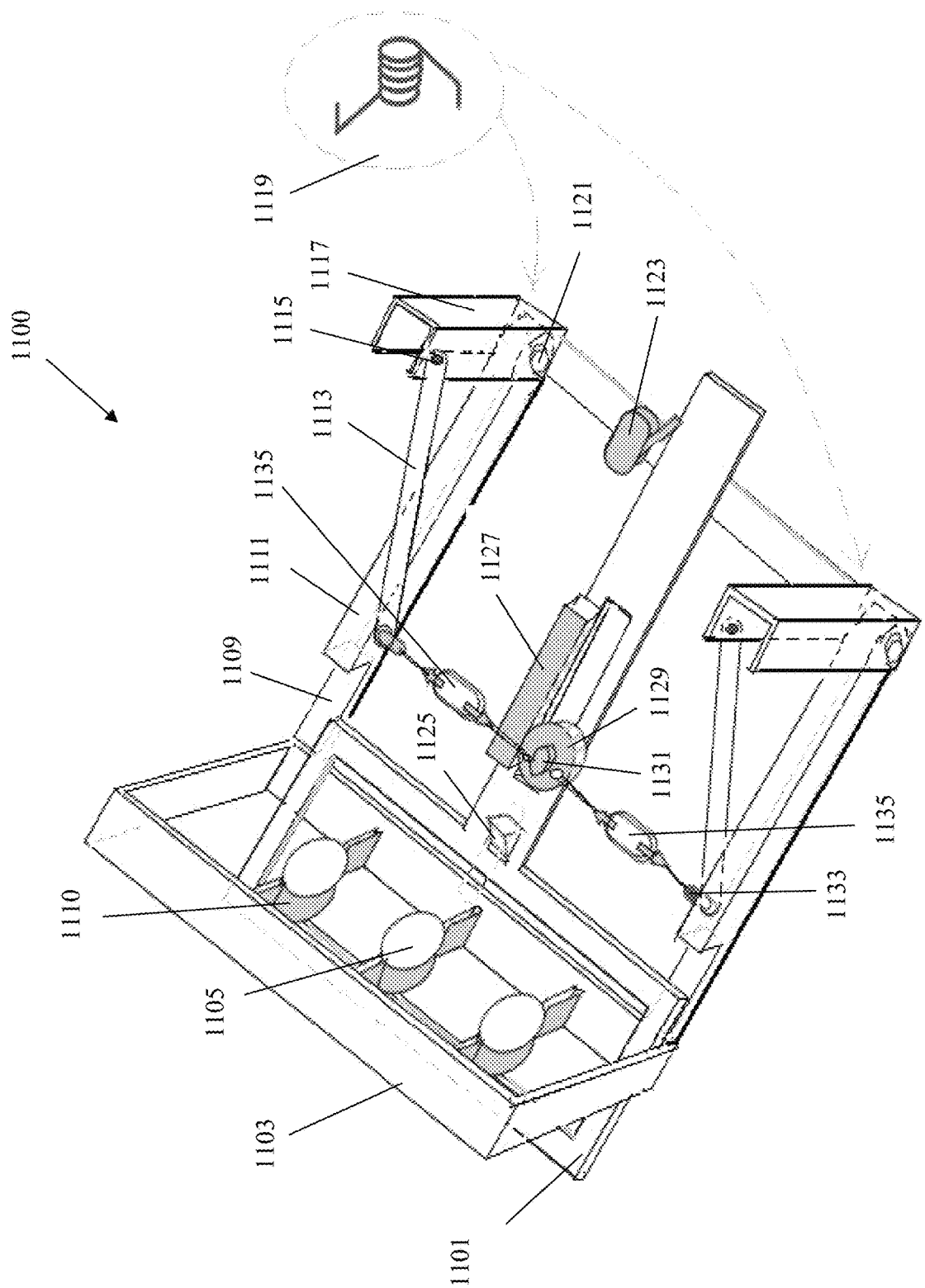
FIG. 11 shows an assembled emergency brake apparatus with alternative bracket in accordance with this application.

FIG. 11 shows an assembled emergency brake apparatus 1100 with the alternative bracket design of FIG. 5.

Figure 12:
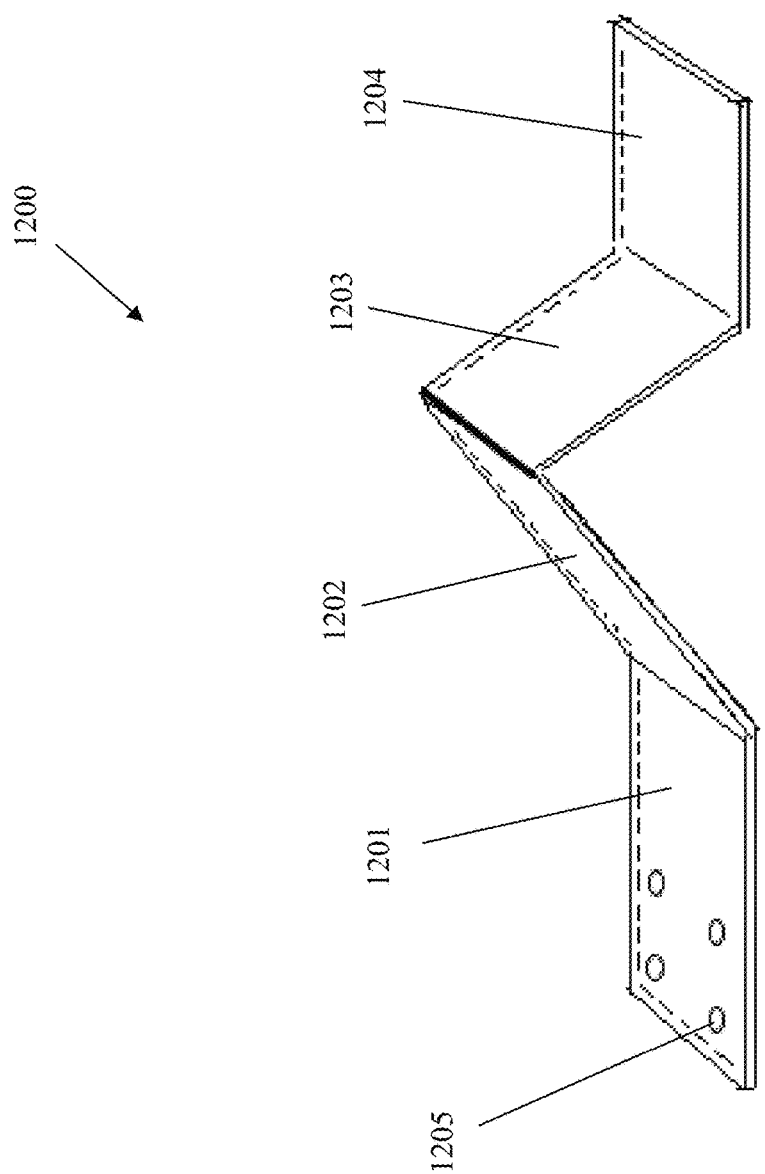
FIG. 12 shows an example metal spring structure of an example emergency brake apparatus in accordance with this application.

FIG. 12 shows a metal spring 1200 that interacts between the airbag assembly and the sliding unlock lever. This metal spring buckles up the airbag assembly with the sliding unlock lever, so that when the car starts up or has an emergency stop, it prevents the sliding unlock lever from moving back and forth during driving.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An emergency brake apparatus for mounting to a chassis of a driverless car, said chassis having a front bumper, a rear bumper and a rear axis connecting rear wheels, comprising:
   an airbag assembly;
   a sliding unlock lever;
   a bracket assembly that comprises two sliding grooves and two fixing grooves, each of the fixing grooves having a front end and a rear end;

a bracket release assembly that nests said sliding unlock lever horizontally to a first position on said bracket assembly; and a contact power switch device mounted on a cross-frame of said bracket assembly adjacent with the sliding unlock lever and said contact power switch being coupled to a power brake system and handbrake to turn on the power brake system.

2. The emergency brake apparatus of claim 1 is configured to be installed onto a bottom frame of the chassis of the car wherein said airbag assembly is mounted in front of the front bumper of the car, and the front ends of the two fixing grooves are positioned at the front bumper of the car and the rear ends of the two fixing grooves are positioned onto the rear axis of the rear wheels to the rear bumper.

3. The emergency brake apparatus of claim 2, further comprising an air fairing mounted in front of said airbag assembly.

4. The emergency brake apparatus of claim 1, wherein the sliding unlock lever comprises a T shaped shaft having a front frame and an elongated lever piece configured with a slot for the bracket release assembly, and said front frame interacts with said airbag assembly and an air fairing or the front bumper of the car.

5. The emergency brake apparatus of claim 4, wherein the bracket release assembly comprises a gear assembly having at least two latches, two wire tensioners, a gear set and wires, said gear set mounted on said elongated lever piece, said latches latched onto said sliding grooves and said fixing grooves.

6. The emergency brake apparatus of claim 5, wherein a collision force moves said sliding unlock lever and releases the sliding unlock lever from said latches to move to push the contact power switch device to turn on a power control of the brake system of the car.

7. The emergency brake apparatus of claim 4, wherein said airbag assembly comprises a supporting frame for holding a plurality of airbags and a metal spring constructed being mounted on said supporting frame; said supporting frame nesting with said front frame of the sliding unlock lever and said metal spring buckling up to a slot configured on the elongated lever piece of the sliding unlock lever.

8. The emergency brake apparatus of claim 1, wherein the airbag assembly comprises an airbag frame of a rectangular shape, said airbag frame is configured to hold a plurality of airbags at a plurality of positions and directions.

* * * * *